(12) United States Patent
Wang et al.

(10) Patent No.: US 8,688,157 B2
(45) Date of Patent: Apr. 1, 2014

(54) WIRELESS COMMUNICATION METHOD AND SYSTEM FOR TRANSMITTING DATA OVER A SELECTED PART OF BANDWIDTH ON A COMMUNICATION PATH

(75) Inventors: Zhaocheng Wang, Stuttgart (DE); Masahiro Uno, Fellbach (DE)

(73) Assignee: Sony Deutschland GmbH, Berlin (DE)

( * ) Notice: Subject to any disclaimer, the term of this patent is extended or adjusted under 35 U.S.C. 154(b) by 1071 days.

(21) Appl. No.: 12/294,703

(22) PCT Filed: Mar. 1, 2007

(86) PCT No.: PCT/EP2007/001781
§ 371 (c)(1),
(2), (4) Date: Oct. 16, 2008

(87) PCT Pub. No.: WO2007/110130
PCT Pub. Date: Oct. 4, 2007

(65) Prior Publication Data
US 2011/0211622 A1    Sep. 1, 2011

(30) Foreign Application Priority Data

Mar. 28, 2006  (EP) .................................... 06006445
Jul. 26, 2006  (EP) .................................... 06015612

(51) Int. Cl.
*H04B 7/00*  (2006.01)

(52) U.S. Cl.
USPC ......................... 455/509; 455/450; 455/452.2

(58) Field of Classification Search
USPC ............. 455/509, 15, 450, 562.1, 561, 277.1, 455/12.1, 101, 69, 500, 517, 61, 103, 105, 455/127.1, 78, 434; 375/220, 267, 260, 375/219, 299, 347, 338; 370/334, 208, 400, 370/310.1, 335, 328, 342, 203, 465
See application file for complete search history.

(56) References Cited

U.S. PATENT DOCUMENTS 5,628,052 A * 5/1997 DeSantis et al. ........... 455/562.1
6,374,109 B1 * 4/2002 Shaheen et al. ............... 455/434
(Continued)

FOREIGN PATENT DOCUMENTS

EP    1 365 474       11/2003
EP    1 659 813 A1    5/2006
(Continued)

OTHER PUBLICATIONS

David Gesbert, et al., "From Theory to Practice: An Overview of MIMO Space-Time Coded Wireless Systems", IEEE Journal on Selected Areas in Communications, vol. 21, No. 3, Apr. 2003, pp. 281-302.

(Continued)

*Primary Examiner* — Edward Urban
*Assistant Examiner* — Golam Sorowar
(74) *Attorney, Agent, or Firm* — Oblon, Spivak, McClelland, Maier & Neustadt, L.L.P.

(57) ABSTRACT

A method providing wireless communication between a first station and a second station. The method establishes at least one communication path between at least one pair of antennas including a first antenna of the first station and a second antenna of the second station, wherein at least one of the first and second antennas is a narrow beam antenna, selects at least one part of the bandwidth available on the communication path, and transmits data between the pair of antennas over the selected part of the bandwidth.

20 Claims, 9 Drawing Sheets

(56) References Cited

U.S. PATENT DOCUMENTS

| | | |
|---|---|---|
| 6,483,814 B1 | 11/2002 | Hsu et al. |
| 2002/0102940 A1* | 8/2002 | Bohnke et al. ............... 455/23 |
| 2004/0009755 A1 | 1/2004 | Yoshida |
| 2004/0242272 A1* | 12/2004 | Aiken et al. ............... 455/562.1 |
| 2005/0085236 A1* | 4/2005 | Gerlach et al. ............... 455/450 |
| 2005/0164664 A1* | 7/2005 | DiFonzo et al. ........... 455/277.1 |
| 2005/0180534 A1* | 8/2005 | Brotje et al. ................ 375/350 |
| 2006/0039312 A1* | 2/2006 | Walton et al. ............... 370/319 |
| 2006/0094372 A1* | 5/2006 | Ahn et al. ................ 455/67.13 |
| 2006/0159052 A1* | 7/2006 | Koga et al. ................ 370/335 |
| 2006/0268675 A1* | 11/2006 | Cho et al. .................. 370/210 |
| 2006/0286974 A1* | 12/2006 | Gore et al. ................ 455/422.1 |
| 2008/0227387 A1* | 9/2008 | Andersson .................. 455/15 |

FOREIGN PATENT DOCUMENTS

| | | |
|---|---|---|
| JP | 8-321799 | 12/1996 |
| WO | 01 39320 | 5/2001 |
| WO | 2005 022681 | 3/2005 |

OTHER PUBLICATIONS

Office Action issued Oct. 17, 2011, in Chinese Patent Application No. 200780011133.7 (English-language translation only).

* cited by examiner

WIRELESS COMMUNICATION METHOD AND SYSTEM FOR TRANSMITTING DATA OVER A SELECTED PART OF BANDWIDTH ON A COMMUNICATION PATH

BACKGROUND (1) Field

The present invention generally relates to the field of wireless communication, and particularly to a method for providing wireless communication between a first station and a second station as well as to a station for performing a wireless communication.

(2) Description of the Related Art

A commonly known type of wireless system makes use of high available bandwidth and small antenna size. Such a system, known as millimeter wave solution, allows for a high rate wireless data transmission e.g. beyond 1 Gbps.

A first known implementation of such a wireless system comprises a channel equalizer including linear, decision feedback or maximum likelihood sequence estimation (MLSE) equalizer. In case of a high data rate transmission, the symbol duration is correspondingly short such that the multipath channel delay spread may be much longer than the symbol duration. As a consequence, the equalizer becomes complex and needs a lot of processing power.

A further known solution uses the orthogonal frequency division multiplexing (OFDM) technique for resisting against multipath interference in wireless communications. This OFDM modulation has been already implemented e.g. for transmissions in wireless LAN systems. However, as an OFDM signal is the sum of a large number of subcarriers, it tends to have a high peak-to-average power ratio (PAPR). Because of the inherent linear modulation of the OFDM technique and because of the high peak-to-average power ratio issue, the overall power consumption of power amplifier is very high with respect to other multiplexing techniques. Another disadvantage is that the OFDM demodulation requires complex units for carrying out high-speed fast Fourier transform (FFT) and other signal processing.

A further solution is proposed by the European patent application 04 027 554 of Sony, which disclosure is herewith incorporated by reference. A pair or several pairs of sharp beam antennas are used for both the transmitting and the receiving side of a wireless communication, wherein each pair of sharp beam antennas can be steered to match the direction of its corresponding strong reflection path. Depending on the steering resolution, the strong reflection path can be matched and other reflection paths can be disregarded. This results in the channel delay spread being shortened. On the other hand, as very few communication paths or ideally only the strongest reflection path is received, the overall received power is drastically reduced. This drawback has to be compensated for by additional antenna gain obtained from the sharp beam antennas.

Accordingly, the known solutions suffer from the need of high-speed and complex signal processing circuits, as well as from high power consumption and non-optimum use of power transmission.

BRIEF SUMMARY

In view of the above, it is the object of the invention to provide for an improved wireless communication technique.

This object is solved by the invention in that a method for providing wireless communication between a first station and a second station is provided, said method comprising establishing at least one communication path between at least one pair of antennas consisting of a first antenna of said first station and a second antenna of said second station, wherein at least one of said first and second antenna is a narrow beam antenna, selecting at least one part of the bandwidth available on said communication path, and transmitting data between said pair of antennas over said selected part of the bandwidth.

Thus, different data can be transmitted over different pairs of antennas to increase the data rate. The multipath propagation is furthermore a benefit for the user as it may be used to improve the capacity of the transmission system or to reduce the power consumption.

Preferably, the method comprising selecting a part of the bandwidth on the basis of the channel transfer function of said communication path.

The method can comprise selecting at least one part of the bandwidth for which the channel transfer function of the communication path is above a threshold.

The threshold used for selecting at least one part of the bandwidth can be constant, frequency-dependent, or time-dependent.

The transmission power dedicated to data transmission over the whole available bandwidth cam be allocated to said selected part of the bandwidth.

The method can comprise transmitting data over said communication path according to a modulation scheme that is selected depending on the transfer function of the communication path.

The method can comprise pre-selecting candidate wireless paths between said pair of antennas, selecting the wireless path having the best received signal strength indication (RSSI) and/or signal-to-noise-ratio (SNR) from among the candidate wireless paths, and establishing a communication path over said selected wireless path.

Said first antenna and said second antenna can be narrow beam antennas.

Alternatively, one of said first antenna and said second antenna can be a wide beam antenna.

An OFDM modulation scheme can be used in said method, wherein the subcarriers of the OFDM signal can be assigned dynamically on different communication paths.

According to a further aspect of the invention, a computer program product is proposed, said computer program product being loadable into a computing means and adapted to perform the steps of the above described method when run by said computing means.

According to a further aspect of the invention, a station for performing a wireless communication is proposed, said station comprising at least one first antenna, means for establishing at least one communication path between said first antenna and a second antenna of a second station, means for selecting at least one part of the bandwidth available on said communication path, and means for transmitting and/or receiving data over said selected part of the bandwidth of said communication path.

The station can comprise means for selecting a part of the bandwidth on the basis of the channel transfer function of said communication path.

Advantageously, the station can comprise means for selecting at least one part of the bandwidth for which the channel transfer function of the communication path is above a threshold.

Said threshold can be constant, frequency-dependent, or time-dependent.

Advantageously, the transmission power dedicated to data transmission over the whole available bandwidth is allocated to said selected part of the bandwidth.

The station can comprise means for transmitting data over said communication path according to a modulation scheme that is selected depending on the transfer function of the communication path.

Furthermore, the station can comprise
means for pre-selecting candidate wireless paths between said pair of antennas,
means for selecting the wireless path having the best received signal strength indication (RSSI) and/or signal-to-noise-ratio (SNR) from among the candidate wireless paths, and
means for establishing a communication path over said selected wireless path.

Said first antenna can be a narrow beam antenna or alternatively a wide beam antenna.

An OFDM modulation scheme can be used, wherein advantageously the subcarriers of the OFDM signal are assigned dynamically on different communication paths, and/or different parts of the bandwidth.

The station can comprise a rake receiver.

Additionally, the station can comprise a channel equalizer circuit.

According to a further aspect of the invention, a multiple input multiple output (MIMO) system is proposed, said system comprising a plurality of stations as defined above.

It has to be noted that the various elements of the invention which are referred to as "means" and the corresponding functionality can be implemented with any kind of respective device, unit, software or hardware elements and parts thereof as well as any other suitable implementation not explicitly mentioned here.

BRIEF DESCRIPTION OF THE DRAWINGS

The features, objects, and advantages of the present invention will become more apparent from the detailed description set forth below when taken in conjunction with the accompanying drawings, in which like reference numbers refer to like parts and wherein.

DETAILED DESCRIPTION

Figure 1:
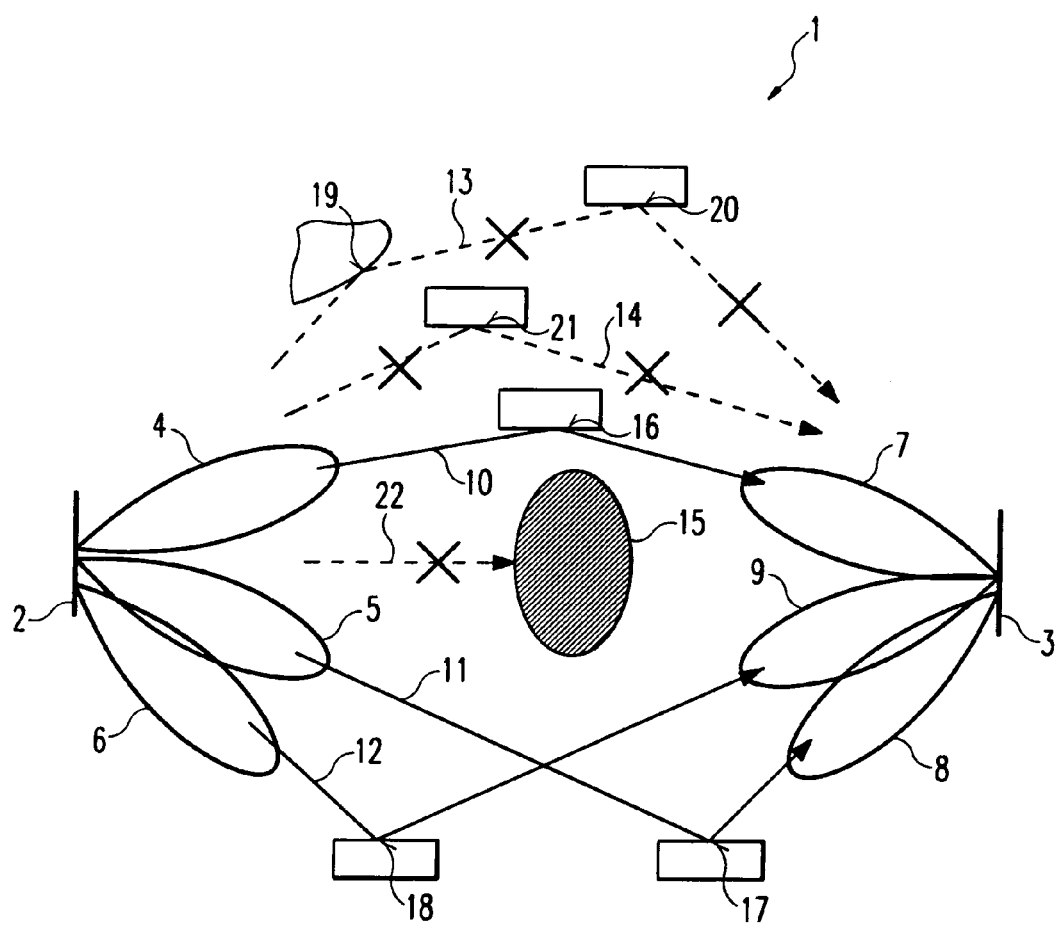
FIG. 1 schematically shows a first embodiment of a communication system according to the invention.

A communication system according to the present invention and referred to with the reference numerals 1 and 1' will now be described with reference to FIGS. 1 and 2 respectively.

The wireless communication system 1 comprises a first station 2 and a second station 3, each one of the first and the second station 2, 3 being adapted to act as a transmitter and/or as a receiver. In the particular embodiment of FIG. 1, said first station 2 comprises three first antennas 4, 5, 6 and said second station comprises three second antennas 7, 8, 9. According to further embodiments of the invention, said first station and/or said second station only comprise one first antenna and/or one second antenna respectively. In other embodiments of the invention, the wireless communication system 1 comprises at least two first antennas 4, 5, 6 and at least two second antennas 7, 8, 9 respectively.

The first antennas 4, 5, 6 and the second antennas 7, 8, 9 are preferably narrow beam antennas or sharp beam antennas, i.e. antennas with a narrow aperture. The directionality of the radiation pattern of said first antennas 4, 5, 6 and of said second antennas 7, 8, 9 can thus be controlled. Such a communication system 1 is also called a rake receiver with sharp beam steering antennas.

Figure 2:
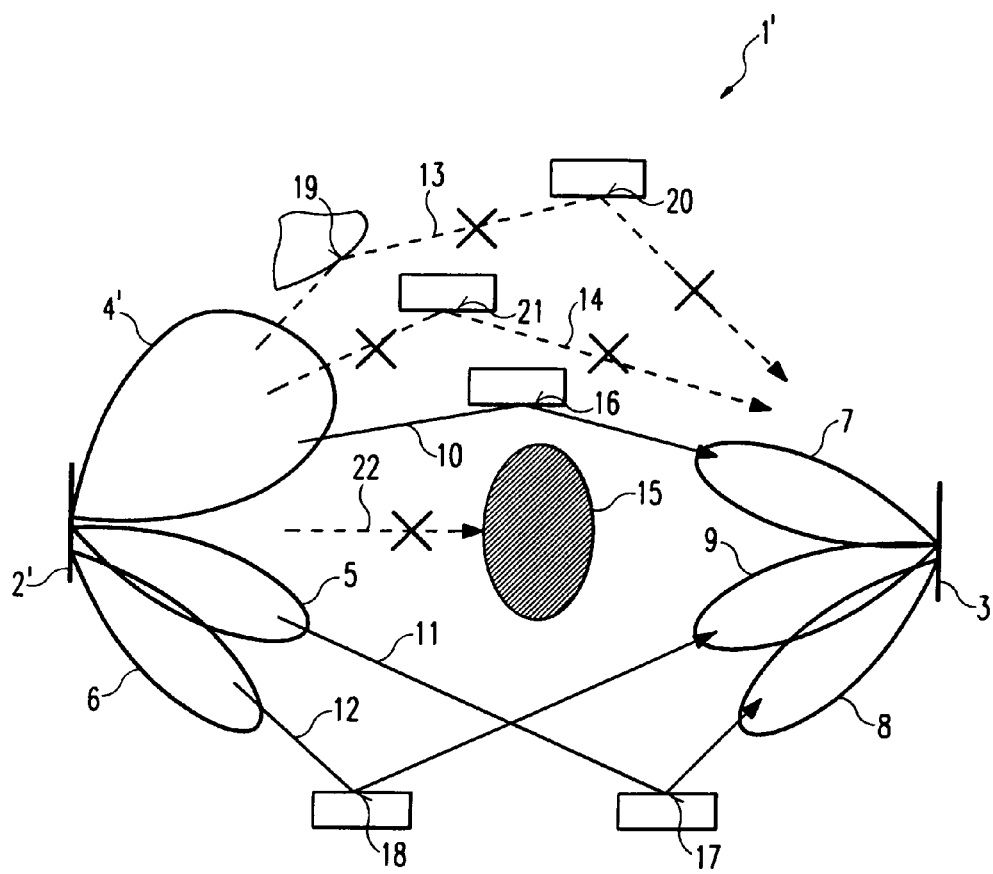
FIG. 2 shows a second embodiment of a communication system according to the invention.

In the alternative embodiment shown in FIG. 2, a wireless communication system 1' comprises a first station 2' having an antenna 4' being a wide beam antenna and two (ore more) further antennas 5, 6 being narrow beam antennas. It is further possible for the first station 2' to comprises more than one first antenna in form of a wide beam antenna. Alternatively or additionally, the second station 3 may also comprise one or more second antennas 7, 8, 9 being wide beam antennas.

The first and second station 2, 3 are adapted to establish at least one first communication path 10 for wireless communication between said first and said second stations 2 and 3. In the particular example of FIG. 1, three communication paths 10, 11, 12 have been established between the first station 2 and the second station 3. The communication paths 10, 11, 12 are preferably distinct from each other.

In the embodiment of FIG. 1, a first pair of narrow beam antennas 4, 7 is steered or directed so as to allow for the transmission of data over said first communication path 10. Preferably, data can be transmitted at the same time via the second communication path 11 and the third communication path 12 between a second pair of narrow beam antennas 5, 8 and a third pair of narrow beam antennas 6, 9 respectively in order to increase the capacity of the wireless communication system 1.

According to the present invention, the wireless communication system 1 comprises at least said first pair of narrow beam antennas 4, 7 for data transmission over said first communication path 10. In case further communication paths 11, 12 are provided between further pairs of narrow beam antennas 5, 8 or 6, 9, the communication paths 10, 11, 12 are preferably different from each other to realize path diversity.

The usage of several pairs of narrow or sharp beam antennas 4, 5, 6, 7, 8, 9 for both sending and receiving side of the station 1, 2 is proposed. Each first narrow beam antenna 4, 5, 6 of the first station 1 is steered to meet a corresponding second narrow beam antenna 7, 8, 9 of the second station 2 along a corresponding communication path 10, 11, 12, and vice versa. Therefore, the use of more than one pair of narrow beam antennas 4, 5, 6, 7, 8, 9 realizes path diversity for environments where no static communication path can be provided.

A further advantage of providing a plurality of different communication path 10, 11, 12 is that the communication between the first station 2 and the second station 3 can be continued or maintained even if one communication path becomes weak or gets lost because of e.g. an obstacle crossing said communication path 10, 11, 12.

In the embodiment of FIG. 1, a direct line-of-sight (LOS) communication path 22 between said first and second station 2, 3 is blocked by an obstacle 15.

Thus, said communication paths 10, 11, 12 are indirect or non-line-of-sight (NLOS) communication paths caused by respective reflecting surfaces 16, 17, 18.

The different non-line-of-sight communication paths 10, 11, 12 can be assumed as being independent from each other. Thus, each non-line-of-sight communication path can be treated as going through a frequency non-selective slow fading channel. The probability that all communication paths 10, 11, 12 become weak or are interrupted completely at the same time is small. Consequently, a communication path diversity gain can be achieved.

For each pair of narrow beam antennas, it is common that a plurality of communication paths can be established. This is e.g. the case for the first pair of narrow beam antennas 4, 7 in FIG. 1, where not only first communication path 10 can be established but also the additional communication path 13, 14. In such cases, the pair of narrow beam antennas 4, 7 is steered to the corresponding strong line of sight path or reflection path preferably according to the following method:

In a first step, the first antenna 4 of the first station 2 and the second antenna 7 of the second station 3 are looking for all possible wireless paths 10, 13, 14 that could be used as communication path between the first and second station 2, 3. In the embodiment of FIG. 1, the available wireless paths are non-light-of-sight paths 10, 13, 14 obtained via corresponding reflection surfaces 16, 19, 20, 21.

Please note that the search for candidate wireless paths may be limited to a given angular area for each antenna. This may e.g. be the case when the first station 2 comprises several first antennas 4, 5, 6 so that said first antennas 4, 5, 6 can be directed to different and complementary areas Once all possible candidate wireless paths have been found for a given pair of antennas 4, 7, the strongest candidate wireless path is selected and the first antenna 4 and the second antenna 7 are steered or guided by mechanical means to this strongest candidate wireless path. This strongest candidate wireless path may be either a line of sight path or a reflection path in case no line of sight path could be found.

The strongest candidate wireless path may be determined by selecting e.g. the wireless path having the best received signal strength indication (RSSI), which is a parameter measuring the received radio signal strength, and/or the best signal-to-noise-ratio (SNR), which is a parameter reflecting the quality of the signal.

If a wireless path corresponding to one pair of antennas 4, 7 shows a high RSSI but a low SNR, it is preferably removed from the list of candidate wireless paths since the received strong signal might come from a strong interferer.

In the embodiment of FIG. 1, the first station 2 and the second station 3 of the wireless communication system 1 only comprise narrow beam antennas such that between each pair of narrow beam antennas 4, 7 only one communication path 10 is used to transmit information. These eliminates any multipath fading effect and consequently any high fluctuation of the frequency response. Each communication path 10 has in fact a relatively flat frequency response.

As stated above the wireless communication system 1' may alternatively comprise one or a plurality of wide beam antennas. In FIG. 2, the first communication path 16 is established between the wide beam antenna 4' of the first station 2' and the narrow beam antenna 7 of the second station 3.

Upon establishing a communication path via a wide beam antenna 4', there is no need for steering this wide beam antenna 4' to all possible candidate wireless paths 10, 13, 14 as those candidate wireless paths may be all within the beam of the wide beam antenna 4'. The use of wide beam antennas 4' at the first station 2' is therefore of advantage as no steering mechanical unit and/or software unit is required.

On the other hand, the second station 3 should preferably comprise one narrow beam antenna 7 for being associated with said wide beam antenna 4' of the first station 2' in order to establish a communication path between said narrow beam antenna 7 and said wide beam antenna 4'. In accordance with the above, said narrow beam antenna 7 may then be steered to the strongest path 10 from among the candidate wireless paths 10, 13, 14.

By the provision of this narrow beam antenna 7, data cannot be transmitted between the first and second station 2', 3 over the weaker candidate wireless paths 13, 14. Consequently, the communication path 10 has a relatively flat frequency response because the delay spread is reduced.

It will now be described with reference to FIGS. 3 to 6 how data are transmitted and received in a communication system 1 in accordance with the present invention.

At least one or preferably a plurality of pairs of antennas are used to transmit data between the first station 2 and the second station 3. Each pair of antenna comprises at least one narrow beam antenna 7 such that it is possible to reduce the multipath channel delay spread and the fluctuations of the frequency response of the communication path.

The narrow beam antenna 7 is characterized by its aperture and by its half-power beam width (HPBW), which defines the angle within which the power radiated is above one half of what it is in the most preferential direction, or the angle when the voltage remains within 70.7% of the voltage developed when the antenna is aimed at the most preferential direction.

When the aperture or the half-power beam width of the narrow beam antenna 7 is reduced, the delay spread can be reduced. On the other hand, the communication path has to be maintained even if a station moves and even if an obstacle appears such that the complexity of the steering mechanism and of the tracking algorithm may increase. Practically, the half-power beam width should therefore not be under a given threshold to limit the complexity of the station so that fluctuation of the channel frequency response may appear.

Furthermore, in millimeter wave circuits there is generally a fluctuation of the frequency response that is caused by design tolerance and mismatching.

Figure 3:
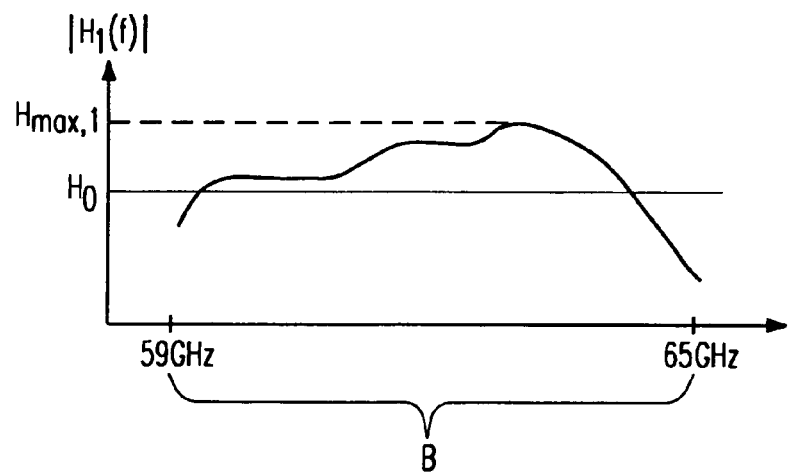
FIG. 3 shows the channel amplitude response over three different communication paths according to an embodiment of the invention.
Figure 3:
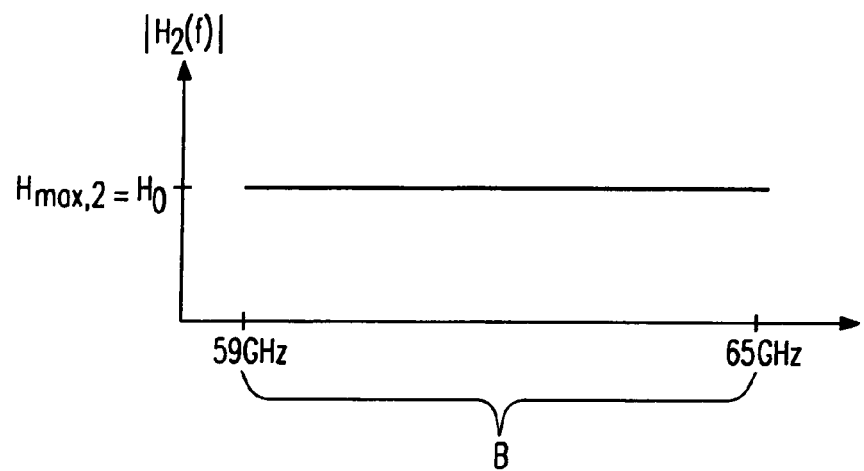
Figure 3:
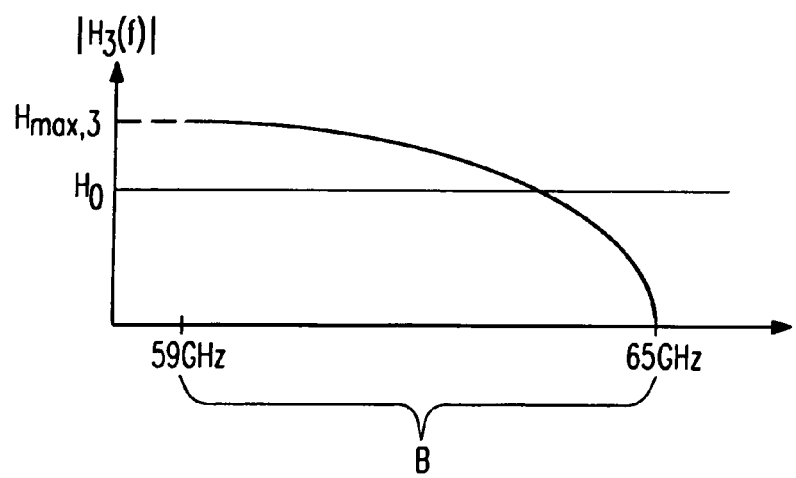

FIG. 3 shows such examples of channel transfer functions that are not flat. The channel transfer functions or channel amplitude responses $|H_1(f)|$, $|H_2(f)|$ and $|H_3(f)|$ correspond to the respective communication paths 10, 11, 12 of the embodiments shown in FIGS. 1 and 2.

The channel amplitude responses $|H_1(f)|$ and $|H_3(f)|$ of the communication paths 10, 12 between the respective pairs of antennas 4, 7 and 6, 9 fluctuate around an value $H_0$ and exhibit a frequency-selective (non-flat) fading over the available bandwidth B, which may extend e.g. from 59 GHz to 65 GHz like in the example of FIG. 3. The channel amplitude response $|H_2(f)|$ of the communication path 11 between the corresponding pair of antennas 5, 8 has a constant value $H_0$ over said available bandwidth B and thus exhibits a frequency-nonselective (flat) fading.

According to the invention, not necessarily the entire available bandwidth B is used for transmitting data over the different communication paths 10, 11, 12 between the first station 2 and the second station 3. Preferably, only the portions of the available bandwidth B are used where the respective channel transfer function is good, i.e. suitable for transmission.

Figure 4:
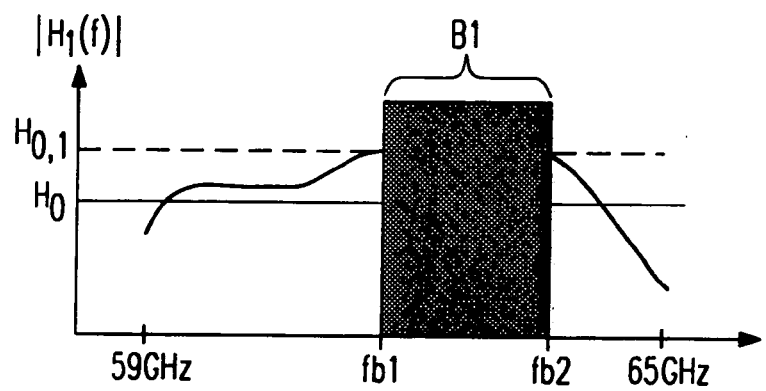
FIG. 4 shows a selection of a part of the bandwidth available for transmission according to the invention.
Figure 4:
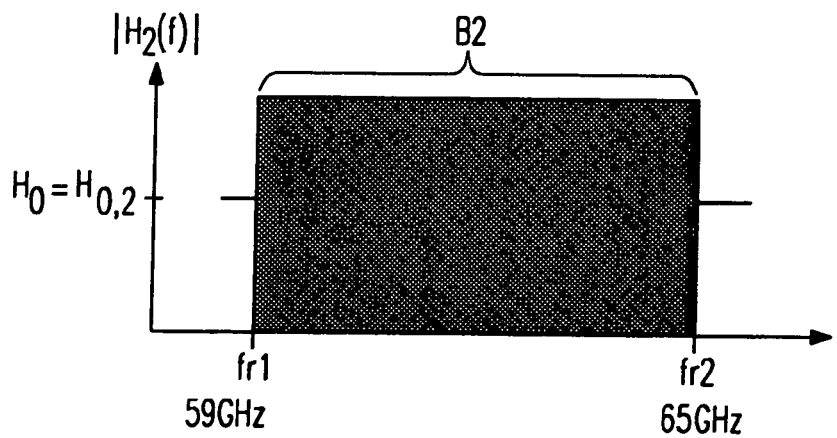
Figure 4:
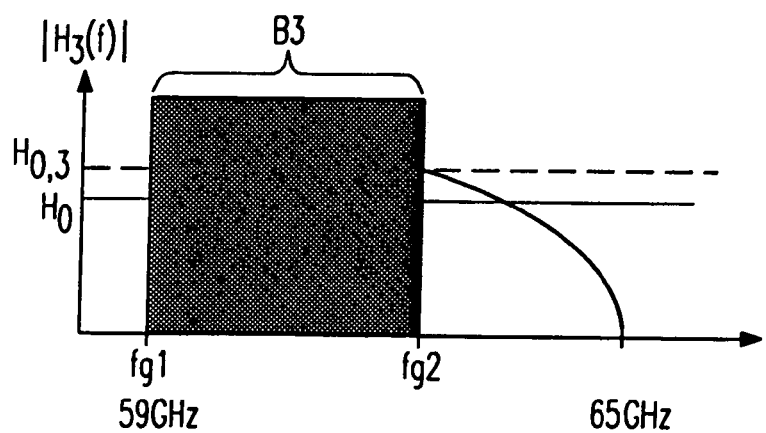

In the particular embodiment of FIG. 4, data are transmitted between the first station 2 and the second station 3 over the bandwidth B1 of the first communication path 10 delimited by the frequencies fb1 and fb2, over the bandwidth B2 of the second communication path 11 delimited by the frequencies fr1 and fr2, as well as over the bandwidth B3 of the third communication path 12 delimited by the frequencies fg1 and fg2.

The bandwidth B1 is the portion of the available bandwidth B where the channel transfer function $|H_1(f)|$ of the first communication path 10 is above a threshold value $H_{0,1}$. Likewise, the bandwidths B2 and B3 are chosen such that the channel transfer functions $|H_2(f)|$ and $|H_3(f)|$ of the respective communication paths 11, 12 are above a respective threshold value $H_{0,2}$ and $H_{0,3}$.

The threshold values $H_{0,1}$, $H_{0,2}$, $H_{0,3}$ are either common to all communication paths 10, 11, 12 or chosen individually for each communication path 10, 11, 12. Said threshold values $H_{0,1}$, $H_{0,2}$, $H_{0,3}$ are a constant value or may be varying with the frequency or the time.

In case a channel transfer function is flat or relatively flat like the function $|H_2(f)|$ in FIG. 3, the whole available bandwidth B may be selected for transmitting data. The bandwidth B2 selected for transmission in FIG. 4 therefore corresponds to the available bandwidth B and the boundary frequencies fr1 and fr2 of said selected bandwidth B2 correspond to the limits of the available bandwidth B that are 59 GHz and 65 GHz.

The threshold values $H_{0,1}$, $H_{0,2}$, $H_{0,3}$ may alternatively depend on the amount of data to be transmitted, or on the used modulation scheme, or even on a preferred size for the resulting selected bandwidth B1, B2, B3. In the latter case, the threshold value is modified such that the selected bandwidth B1, B2, B3 being above said threshold has a given or predetermined size.

It is also possible to set the threshold values $H_{0,1}$, $H_{0,2}$, $H_{0,3}$ dependently on the maximal value $H_{max,1}$, $H_{max,2}$, $H_{max,3}$ of the corresponding channel transfer function. As an example, it is possible to transmit data via the first communication path 10 only over frequencies that have a channel transfer function between the maximal value $H_{max,1}$ and a lower value $H_{max,1}-\Delta_H$.

The selected bandwidth B1 for transmitting data can consist of several separated portions or frequency ranges of the total available bandwidth B if e.g. two regions of the channel transfer function $H1(f)$ that are above the threshold $H_{0,1}$ are separated by a region of said channel transfer function $H1(f)$ that is below said threshold $H_{0,1}$. In this case, the threshold $H_{0,1}$ may be decreased such that the resulting selected bandwidth B1 can be extended to only one frequency range.

According to the invention, the transmission power is adapted to the size of the selected bandwidth B1, B2, B3 for transmission. If the selected bandwidth B1, B2, B3 is smaller than the available bandwidth B, it is proposed to increase the transmission power $P_{B1}$, $P_{B2}$, $P_{B3}$ allocated to the selected bandwidth B1, B2, B3 that is actually used for transmission.

The total power $P_B$ available for transmission over the whole available bandwidth B is concentrated for each communication path 10, 11, 12 on the corresponding selected bandwidth B1, B2, B3. As a consequence the overall signal-to-noise-ratio and thus the bit error performance of the respective communication path 10, 11, 12 is improved.

A first possibility consists in using all available transmission power $P_B$ for the transmission over the selected bandwidth B1, B2, B3. For the first communication path 10, this means that $$P_{B1}=P_B$$

with $P_{B1}$ being the transmission power actually used to transmit over the selected bandwidth B1 of the first communication path 10, and
$P_B$ being the power available for transmission over the available bandwidth B of the first communication path 10.

A second possibility consists in concentrating only a part of the available transmission power $P_B$ on the corresponding selected bandwidth B1, B2, B3. In this way, the transmission power allocated to the selected bandwidth B1, B2, B3 can be increased like for the first possibility, but at the same time the actually used transmission power can be reduced with respect to the available transmission power $P_B$. This reduction of the actually used transmission power can be made without any significant loss in transmission quality.

Figure 5:
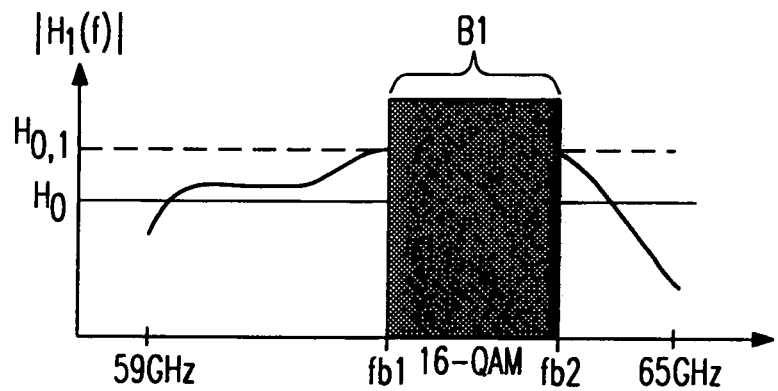
FIG. 5 shows a modulation scheme selection according to the present invention.
Figure 5:
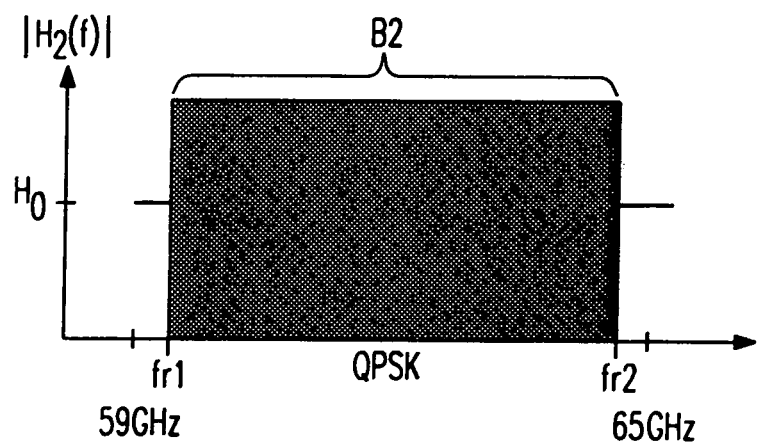
Figure 5:
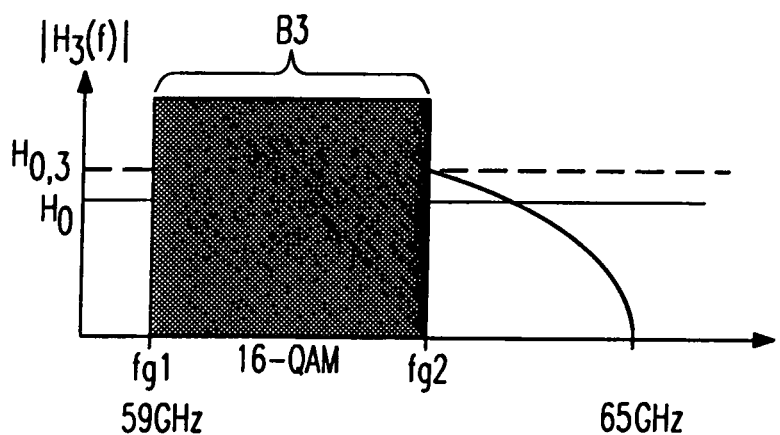

According to a further refinement of the present invention as illustrated in the diagrams depicted in FIG. 5, different modulation schemes (e.g. QPSK, 16-PSK, 16-QAM, 32-QAM, 64-QAM, 128-QAM or higher-order modulation schemes having a symbol constellation size of $2^b$ modulation symbols with b≥8) are preferably selected for each communication path 10, 11, 12 depending on the current RSSI or SNR measurement of this path in order to keep the data transmission rate unchanged.

Even if data are transmitted only over a part B1 of the available bandwidth B, the data rate can be maintained constant by increasing the number of constellation points of the modulation scheme. E.g. if data are to be transmitted over a bandwidth B1 being the half of the available bandwidth B, the data rate can be kept constant by doubling the number of constellation points of the modulation scheme, and for example by selecting the 32-QAM modulation scheme instead of a 16-QAM modulation scheme.

The digital modulation scheme may also be selected dynamically for each communication path 10, 11, 12 depending on the channel transfer function of said communication path in order to maximize the capacity of the communication system 1. The number of constellation points of the used modulation scheme is then optimized in accordance with the value of the channel transfer function in the selected bandwidth B1, B2, B3.

In the embodiment of FIG. 5, the modulation scheme QPSK is used for transmitting data over the second communication path 11. In the selected bandwidths B1, B3 for transmitting data over the first and third communication path 10, 12, the value of the respective channel transfer function H1, H3 is higher than the channel transfer function H2 in the selected bandwidth B2 of the second communication path 11. Accordingly, the modulation scheme of said first and third communication paths 10, 12 can be increased to 16-QAM without loss of quality to at least maintain the data rate at a constant level.

In the following embodiment described with reference to FIG. 6, it shall be assumed that the narrow beam antennas 4, 5, 6, 7, 8, 9 of the transmission system 1 have an HPBW of 20°, an horizontal or azimuthal beam control range of 80° as well as a vertical or elevational beam control range of 80°.

When determining the communication paths 10, 11, 12 to be used for data transmission between the first station 2 and the second station 3, a list of candidate wireless paths is established according to the above-described method. From this list of candidate wireless paths, a list of candidate antenna positions can be deduced for each of the first and the second station 2, 3. In case the number of candidate antenna positions is 16 for both the first and the second station 2, 3, the number of candidate wireless paths will be 16*16=256.

Figure 6:
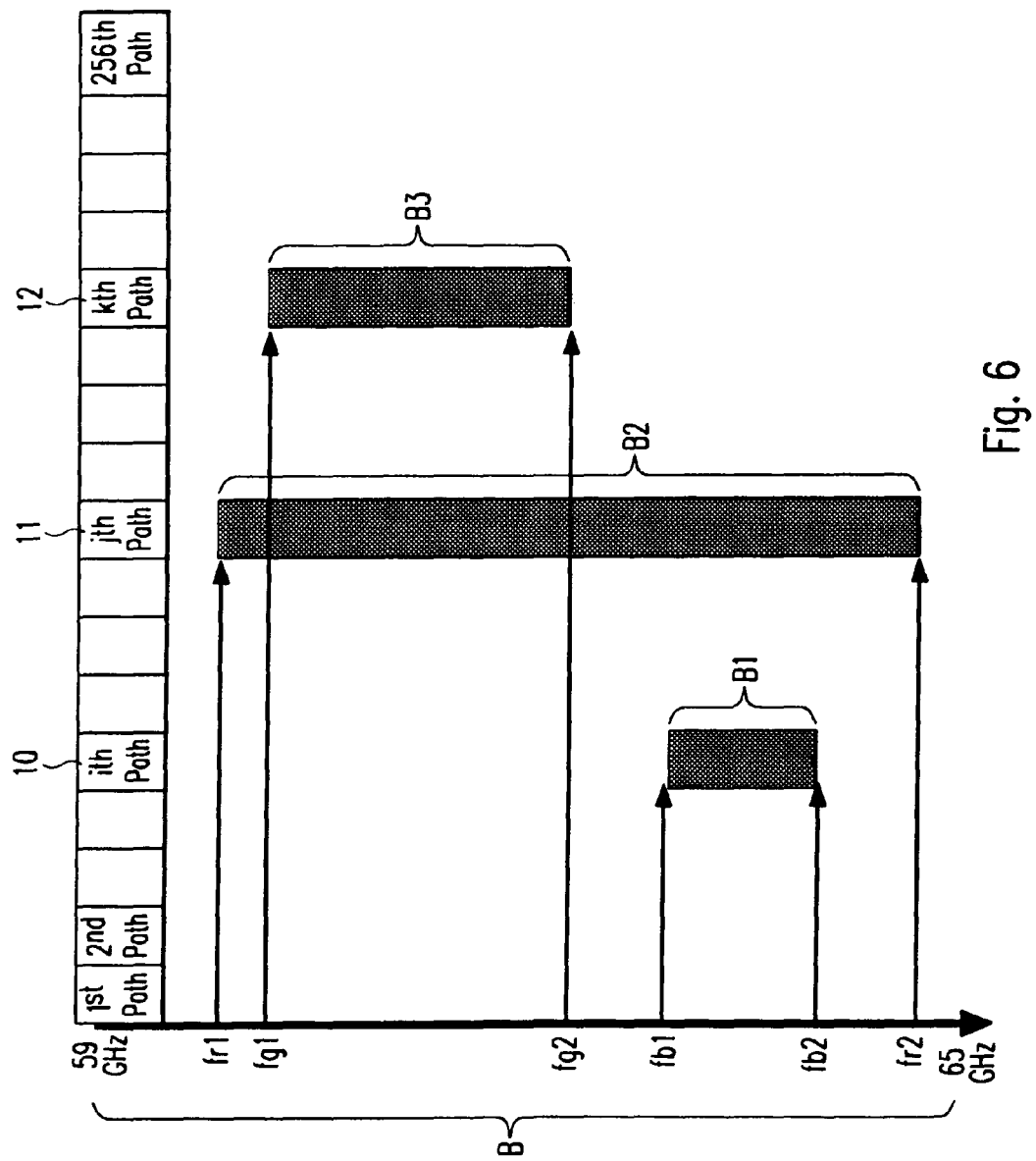
FIG. 6 shows a dynamic space, frequency and modulation selection according to the invention.

FIG. 6 shows a two-dimensional space-frequency grid that can be obtained when determining the candidate antenna positions and the corresponding candidate wireless paths 1 to 256 within the communication system 1 of FIG. 1.

The available bandwidth B is preferably comprised between 59 GHz and 65 GHz.

As the first station 2 comprises three first antennas 4, 5, 6 and the second station 3 comprises three second antennas 7, 8, 9, three communication paths 10, 11, 12 can be established between the first and the second station 2, 3. Said three communication paths 10, 11, 12, which are chosen from among the 256 possible candidate wireless paths, are as stated above the three strongest candidate wireless paths based on the result of an RSSI or SNR measurement, see FIG. 6.

As shown in FIG. 6, a fluctuation of the channel amplitude response $|H_1(f)|$, $|H_2(f)|$, $|H_3(f)|$ of each communication path 10, 11, 12 exists and good channel transfer function suitable for data transmission might only be found within a part of the available bandwidth B. In the present embodiment, data may therefore only be transmitted between the frequencies fb1 and fb2 for the first communication path 10, between the frequencies fr1 and fr2 for the second communication path 11, and between the frequencies fg1 and fg2 for the third communication path 12.

As a result, if the transmission power is concentrated on the bandwidths B1, B2, B3 having a relatively high channel transfer function based on RSSI and/or SNR measurement results, the whole radiated transmission power $P_{B1}+P_{B2}+P_{B3}$ can be reduced.

A further aspect of the present invention is directed to a deterministic multiple input multiple output (MIMO) spatial multiplexing system, wherein spatial antenna diversity, that can be achieved by using an antenna array consisting of multiple antennas at a receiver side and/or a further antenna array consisting of multiple antennas at a transmitter side, is applied to considerably improve the BER performance of the wireless communication system and to mitigate the effects of inter-symbol interference (ISI) caused by multipath fading channels, which significantly deteriorates the BER performance of said wireless communication system, without expanding the signal bandwidth of modulated RF signals to be transmitted. The antenna array thereby consists of a set of antennas designed to receive signals radiating from specific directions and to attenuate signals radiating from other directions of no interest. Thereby, multiple transmitting antennas are employed to create multiple spatial transmission channels and, hence, provide the capability to increase the data transmission rate of said wireless communication system. In particular, with an array of N spatially separated antennas on a transmitter side and an array of M spatially separated antennas on a receiver side (M≥N) an N-fold increase in data transmission rate can be accomplished and, simultaneously, an M-th order reception diversity can be provided to effectively combat multipath fading for each RF signal transmitted by any one of the N transmitting antennas.

In the proposed MIMO system, spatial antenna diversity is applied by using multiple-element antenna arrays. In the present embodiment of the communication system 1 comprising three pairs of antennas on the first station 2 and the second station 3 respectively, three strongest communication paths 10, 11, 12 are chosen as described above, wherein the multipath propagation channel transfer function can be defined by the following equation:

$$H(f) := \begin{pmatrix} H_{11}(f) & H_{12}(f) & H_{13}(f) \\ & \vdots & \\ H_{21}(f) & H_{22}(f) & H_{23}(f) \\ & & \\ H_{31}(f) & H_{32}(f) & H_{33}(f) \end{pmatrix}$$

This equation can be generalized to a communication system comprising N pairs of antennas:

$$H(f, t_0) := \begin{pmatrix} H_{11}(f, t_0) & \cdots & & H_{1N}(f, t_0) \\ \vdots & \ddots & \vdots & \cdots & \vdots \\ \vdots & & \cdots & \ddots & \vdots \\ H_{N1}(f, t_0) & \cdots & & HN_{NN}(f, t_0) \end{pmatrix} \in C^{N \times N}$$

wherein $H_{ij}$ is the channel transfer function of the wireless path between the i-th transmitting antenna and the j-th receiving antenna.

In comparison with conventional MIMO systems according to the prior art, the following differences can be observed:
- Due to the usage of narrow-beam antennas on both the transmitter and the receiver side, the channel transfer function $H_{ii}$ between a pair of narrow beam antennas is much higher than the channel transfer function $H_{ij}$, i≠j.
- Due to the usage of narrow-beam antennas on both the transmitter and the receiver side, the channel transfer function $H_{ii}$ is quasi-static.
- In a conventional MIMO systems, all transmit and receive antenna elements use the same bandwidth and carrier frequency. However, since different pairs of narrow-beam antennas may occupy different bandwidths B1, B2, B3 and spectra in the deterministic MIMO spatial multiplexing system according to the present invention, the channel transfer function $H_{ij}$, i≠j, becomes even smaller.

In summary, the cross interference between different pairs of narrow-beam antennas is small and can easily be canceled by using any simple algorithm which is already adopted in conventional MIMO spatial multiplexing systems according to the prior art.

A further advantageous difference between the present invention and the state of the art consists in the fact that, when being applied to wireless MIMO space-frequency communication systems, a higher transmission capacity and a lower transmission power can be achieved.

Figure 7A:
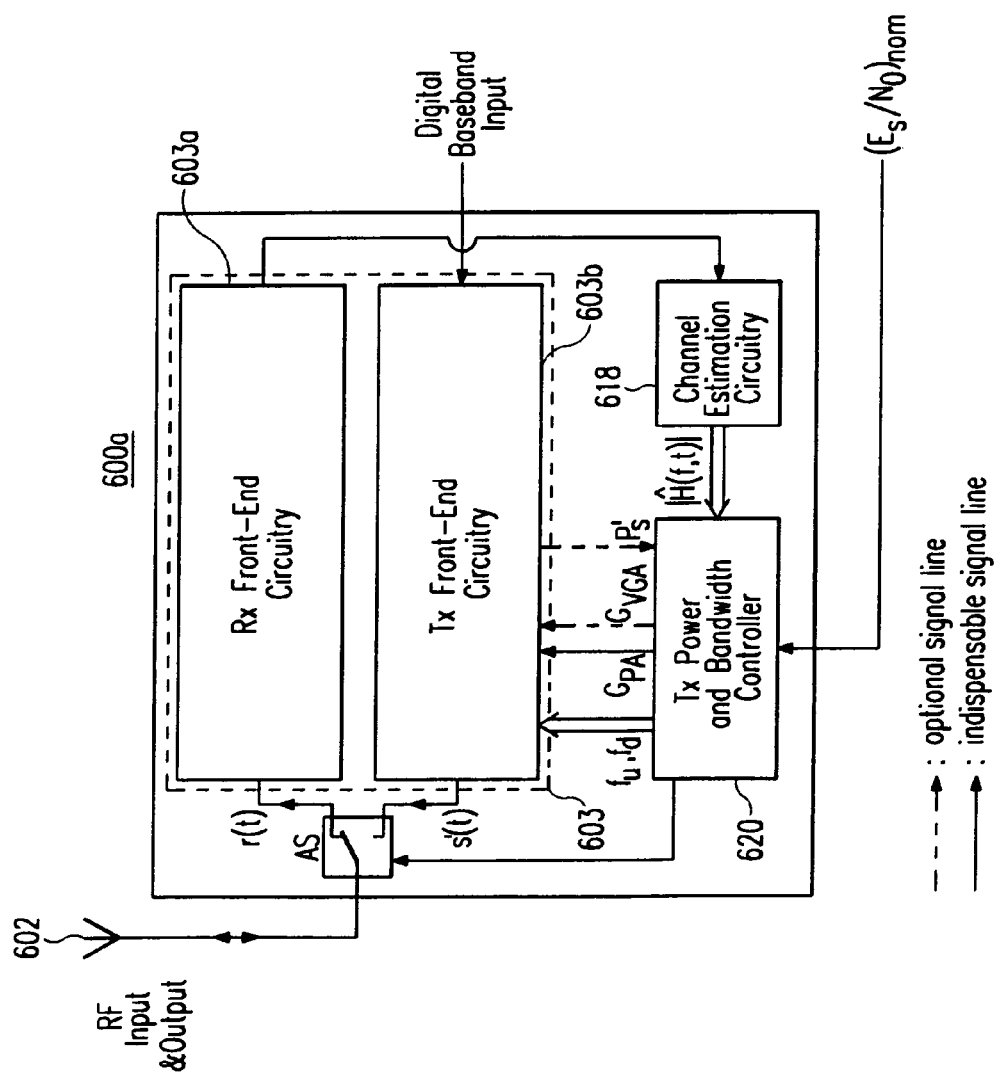
FIG. 7a shows a schematic block diagram of a wireless communication device for wirelessly transmitting and receiving modulated RF signals according to the present invention.

In FIG. 7a a schematic block diagram of a wireless communication device 600a for wirelessly transmitting and receiving modulated RF signals according to an embodiment of the present invention is shown. Said wireless communication device 600a thereby comprises a wireless transmitter front-end circuitry 603b for up-converting, amplifying, band-select filtering and wirelessly transmitting a digital-to-analog-converted baseband signal to be wirelessly transmitted, a wireless receiver front-end circuitry 603a for receiving, bandselect-filtering, amplifying and down-converting a modulated RF test signal r(t) being distorted owing to frequency-selective multipath fading of the wireless communication channel over which the modulated RF test signal r(t) has been received to the baseband and feeding an analog-to-digital-converted version of the thus obtained baseband signal to a channel estimation circuitry 618 post-connected to said wireless receiver front-end circuitry 603a. Furthermore, said wireless communication device 600a comprises a power and bandwidth controller module 620 which is used for selecting those parts B1, B2, B3 of the available channel bandwidth B in a wireless communication system where the channel amplitude response $|H_1(f,t)|$ of a specific communication path 10, 11, 12 between the wireless communication device and a further wireless communication device exceeds a threshold value as described above. As shown in FIG. 7a, the power and bandwidth controller module 620 is supplied with estimates of said channel amplitude response $|H_1(f,t)|$, which are calculated/estimated by the channel estimation circuitry 618 from the digital baseband output signal of said wireless receiver front-end circuitry 603a and the original (undistorted) digital baseband representation of the RF test signal r(t) stored in an internal memory of said channel estimation circuitry 618. Additionally, said power and bandwidth controller module 620 is provided with a predetermined nominal signal-to-noise ratio value $(E_s/N_0)_{nom}$ prescribing a power level $P_s'$ to which a total transmit power $P_s$ of a modulated RF signal s(t) to be wirelessly transmitted by the wireless transmitter front-end circuitry 603b has to be set within the selected part of the available channel bandwidth B. For controlling the power level of the total transmit power $P_s$, a signal representative of gain factor $G_{PA}$ of a variable-gain power amplifier comprised in the wireless transmitter front-end circuitry 603b is supplied from power and bandwidth controller module 620 to the variable-gain power amplifier. If the actual power level $P_s$ is higher than the power level $P_s'$, the gain factor $G_{PA}$ is decreased. Vice versa, said gain factor $G_{PA}$ is increased in case $P_s$ is lower than $P_s'$. Moreover, the power and bandwidth controller module 620 is used for varying the passband of a band-select filter comprised in the wireless transmitter front-end circuitry 603b by setting the bandwidth of said band-select filter to the bandwidth B1, B2, B3 of the selected part, determining an amount $P_s'$ of the total transmit power $P_s$ for wirelessly transmitting the modulated RF signal s(t) which is needed for increasing the signal-to-noise ratio $E_s/N_0$ of said wireless communication channel within the above-mentioned selected part of the available channel bandwidth B to predetermined nominal value $(E_s/N_0)_{nom}$ and setting total transmit power $P_s$ to this power level $P_s'$, thereby reducing the total transmit power $P_s$ while simultaneously keeping the data transmission rate R of the wireless communication system unchanged, and concentrating this power level $P_s'$ on the selected part of the available channel bandwidth B. For controlling the passband of said band-select filter, a signal representative of the cut-off frequencies of the band-select filter are supplied from the power and bandwidth controller module 620 to said band-select filter. Optionally, said power and bandwidth controller module 620 can be supplied with an analog signal representative of output power level $P_s'$ of the variable-gain power amplifier. Further optionally, a digital control signal for controlling the gain factor $G_{VGA}$ of a further variable-gain amplifier comprised in the wireless transmitter front-end circuitry 603b which is applied for preamplifying a low-pass-filtered version of the digital-to-analog-converted baseband input signal fed to the wireless transmitter front-end circuitry 603b, can be supplied from the power and bandwidth controller module 620 to the further variable-gain amplifier. In FIG. 7a, signal lines referring to said two optional signals are represented by broken lines. According to the embodiment of the wireless communication device 600a as depicted in FIG. 7a, an antenna switch AS which is controlled by said power and bandwidth controlling means 620 is used for selectively switching between transmission (Tx) and reception (Rx) mode of said wireless communication device 600a. It should be noted that this wireless communication device 600a is further equipped with a Tx/Rx antenna 602 that can either be realized as a narrow-beam antenna or as a wide-beam antenna as described above.

Figure 7B:
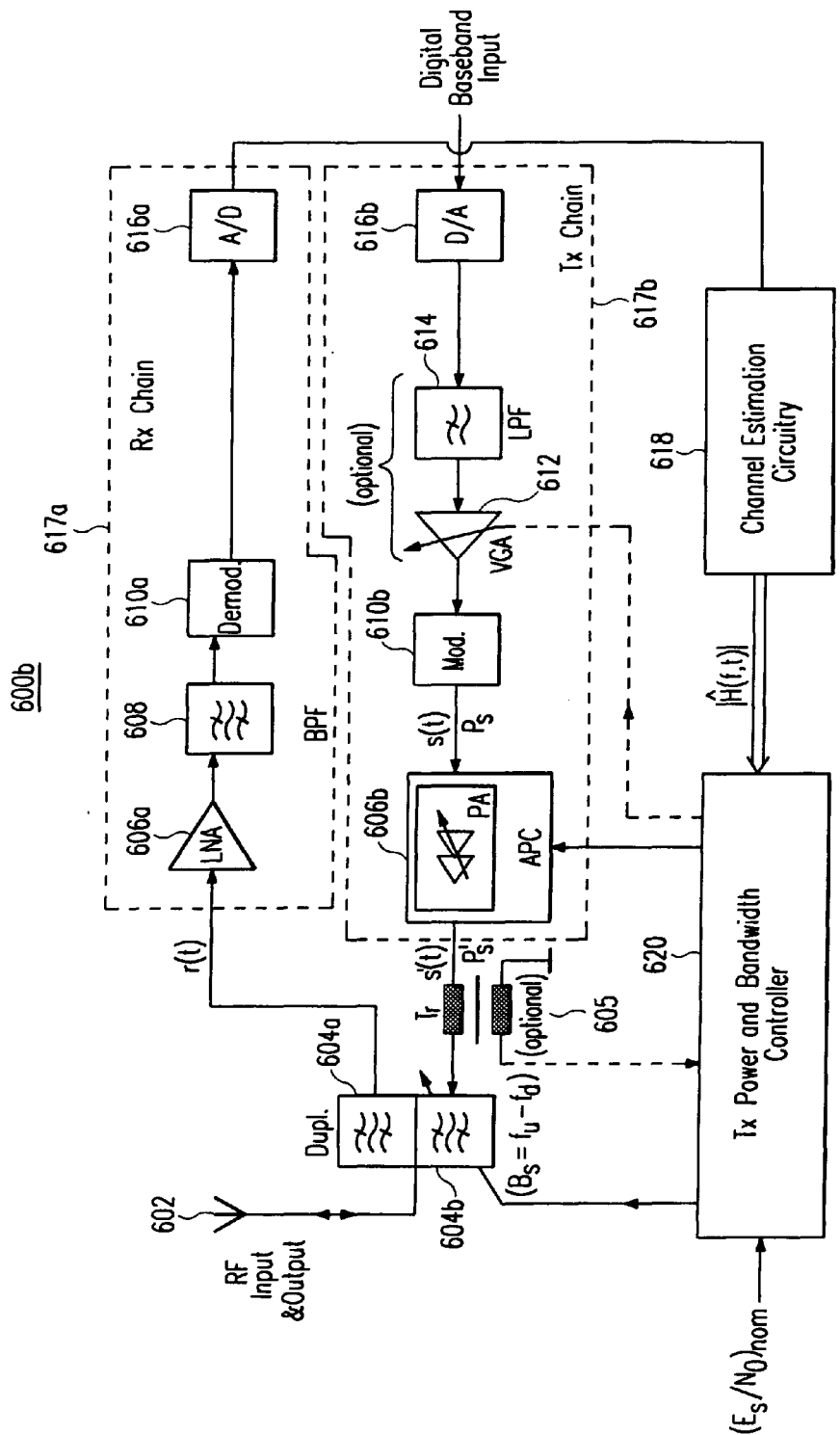
FIG. 7b presents a more detailed embodiment of the wireless communication device depicted in FIG. 7a, and FIG. 8 shows a block diagram of a QAM transmitter front-end circuitry according to the present invention that is specially configured for controlling the output power level and the bandwidth of an I/Q-modulated RF signal to be transmitted.

A more detailed embodiment of the wireless communication device 600a depicted in FIG. 7a is shown in FIG. 7b. Therein, the power and bandwidth controlling means 620 is used for controlling the passband of a duplexer filter's band-select filter component 604b connected to the output port of a transmit chain 617b within the wireless transmitter front-end circuitry 603b by setting the bandwidth of the band-select filter component 604b to the bandwidth B1, B2, B3 of the selected part. The power and bandwidth controlling means 620 is further used for controlling the gain factor $G_{PA}$ of a variable-gain power amplifier PA comprised in an automatic power control circuitry 606b at the output port of the wireless transmitter front-end circuitry 603b. If the actual power level $P_s$ is higher than the power level $P_s'$, the gain factor $G_{PA}$ is decreased. Vice versa, said gain factor $G_{PA}$ is increased in case $P_s$ is lower than $P_s'$. Optionally, said power and bandwidth controller module 620 can be supplied with an analog signal representative of the output power level $P_s'$ of the variable-gain power amplifier, said analog signal being inductively coupled out by an optional directional coupler Tr. Further optionally, a digital control signal for controlling the gain factor $G_{VGA}$ of a further variable-gain amplifier 612 comprised in the wireless transmitter front-end circuitry 603b which is applied for preamplifying a low-pass-filtered version of the digital-to-analog-converted baseband input signal fed to the wireless transmitter front-end circuitry 603b, can be supplied from the power and bandwidth controller module 620 to the further variable-gain amplifier. As in FIG. 7a, signal lines referring to said two optional signals are also represented by broken lines.

Figure 8:
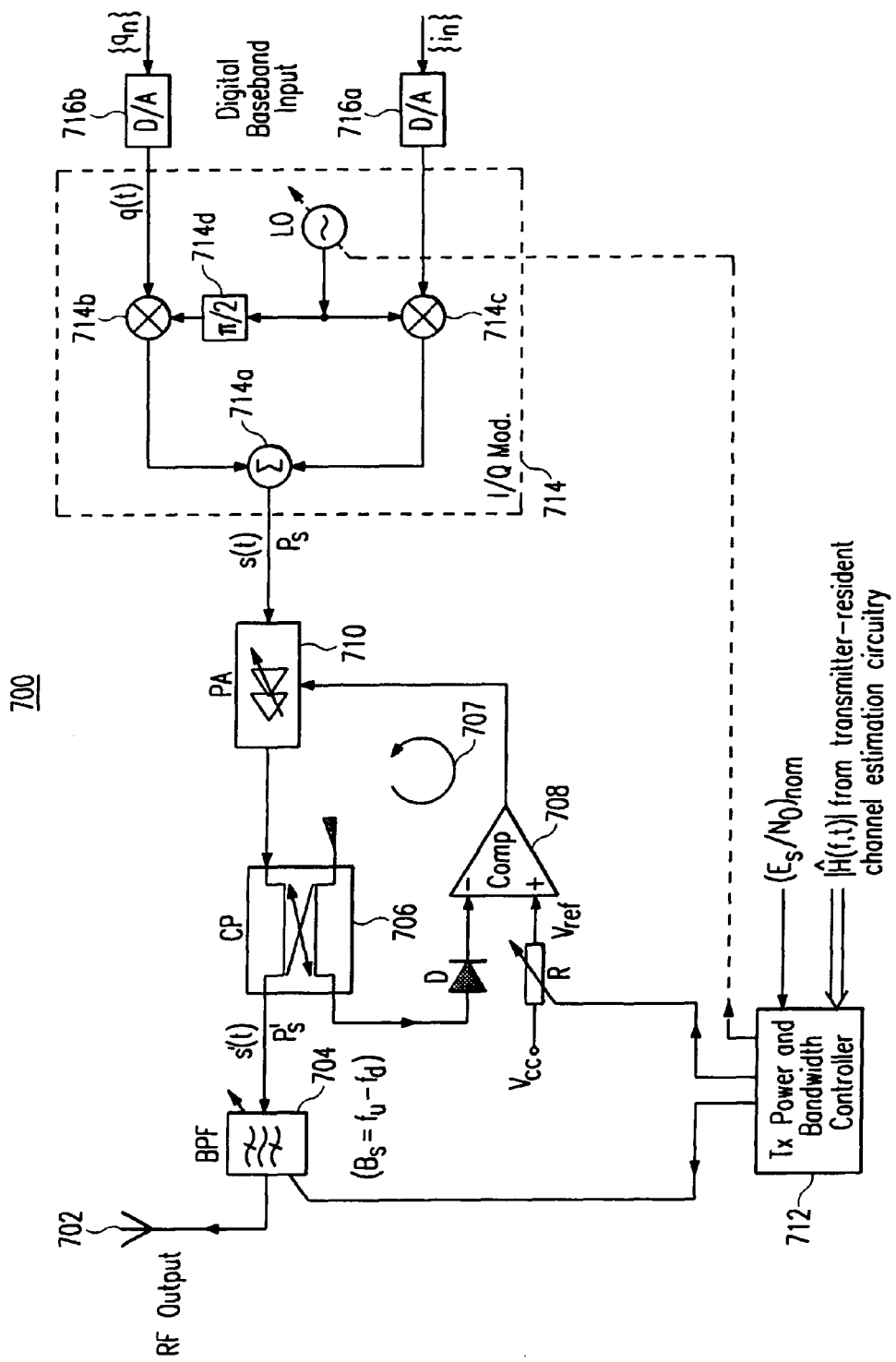

A block diagram of a QAM transmitter front-end circuitry which is specially configured for controlling the output power level $P_s$ and the bandwidth B of an I/Q-modulated RF signal to be transmitted dependent on estimates of the channel amplitude response $|H_1(f,t)|$ a communication path 10, 11, 12 (e.g. the least-distorted signal propagation path) between a pair of antennas according to the above-described method of the present invention, said pair of antennas consisting of at least one transmit (Tx) antenna located at the QAM transmitter 700 to at least one receive (Rx) antenna located at a wireless receiver, is depicted in FIG. 8. The QAM transmitter front-end circuitry comprises a conventional automatic power control (APC) loop 707 according to the state of the art which is used for stabilizing the power level of the I/Q-modulated RF signal s(t) at the RF output port of said QAM transmitter. The APC loop comprises a comparator stage 708 (Comp) whose non-inverting input port is supplied with a reference voltage $V_{ref}$ representing the nominal power level $P_s'$ for the power $P_s$ of the modulated RF signal s(t) to be transmitted. The actual output power level of s(t) is supplied to this APC loop 707 by a directional coupler 706 and is fed back to the inverting input port of said comparator stage 708 by a wideband detector diode D. The output port of said comparator stage 708 is connected to the gain control input port of a variable-gain power amplifier 710 which is applied to control the output power level $P_s$ of the QAM transmitter. If the actual power level $P_s$ is higher than the power level $P_s'$ as represented by reference voltage $V_{ref}$, the gain factor $G_{PA}$ of the variable-gain power amplifier 710 is decreased. Vice versa, said gain factor $G_{PA}$ is increased in case $P_s$ is lower than $P_s'$. According to the present invention, said QAM transmitter is equipped with a microcontroller 712 which is used for selecting a part B1, B2, B3 of the available channel bandwidth B where the channel amplitude response $|H_1(f,t)|$ of the communication path 10, 11, 12 between said pair of narrow-beam antennas exceeds a threshold value. Thereby, $|H_1(f,t)|$ is given by a digital sequence of channel amplitude response estimates supplied by a transmitter-resident channel estimation circuitry. Furthermore, said microcontroller 712 is used for varying the passband of a band-select filter 704 placed at the RF output port of said QAM transmitter front-end circuitry by setting the bandwidth of said band-select filter 704 to the bandwidth B1, B2, B3 of the selected part, determining an amount $P_s'$ of the total transmit power $P_2$ for wirelessly transmitting the modulated RF signal $s(t)$ that is needed for increasing the signal-to-noise ratio (SNR) of the underlying wireless communication channel within the selected part B1, B2, B3 of the available channel bandwidth B to a predetermined nominal signal-to-noise ratio value $(E_s/N_0)_{nom}$ and setting reference voltage $V_{ref}$ to a value proportional to this power level $P_s'$, thus reducing total transmit power $P_s$ to this amount $P_s'$ while simultaneously keeping the data transmission rate R of the underlying wireless communication system unchanged, and concentrating power level $P_s'$ on the selected part B1, B2, B3 of the available channel bandwidth B. According to the invention, carrier frequency $f_{LO}$ generated by local oscillator 714e integrated within I/Q modulator 714 can be controlled by microcontroller 712 dependent on $(E_s/N_0)_{nom}$ and estimates of $|H_1(f,t)|$ so as to provide for center frequency of band-select filter 704 to coincide with one of the transmit frequencies $f_{LO} \pm f_{s,LP}$ of I/Q-modulated RF transmit signal $s(t)$ at the output port of I/Q modulator 714, wherein $f_{s,LP}$ denotes the frequency of the analog complex baseband signal $s_{LP}(t) = i(t) + j \cdot q(t)$ at the input port of said I/Q modulator 714, such that $f_{LO} + f_{s,LP}$ and/or $f_{LO} - f_{s,LP}$ fall within the passband of band-select filter 704.

The invention claimed is:

1. A method for providing wireless communication between a first station and a second station comprising:
    establishing a plurality of communication paths between different pairs of antennas respectively including a first antenna of the first station and a second antenna of the second station, wherein at least one of the first and second antennas is a narrow beam antenna;
    selecting, for said plurality of communication paths, a part of bandwidth available on a respective communication path based on a channel transfer function of the communication paths being above a threshold; and
    transmitting data between the different pairs of antennas over the selected part of the bandwidth selected for the communication path established between the respective pair of antennas,
    wherein a transmission power dedicated to data transmission over the whole available bandwidth is allocated to the selected part of the bandwidth.

2. The method according to claim 1, wherein the threshold is constant, frequency-dependent, or time-dependent.

3. The method according to claim 1, further comprising transmitting data over the communication paths according to a modulation scheme that is selected depending on a transfer function of the communication paths.

4. The method according to claim 1, further comprising:
    pre-selecting candidate wireless paths between the pairs of antennas;
    selecting the wireless path having a best received signal strength indication and/or signal-to-noise-ratio from among the candidate wireless paths; and
    establishing a communication path over the selected wireless path.

5. The method according to claim 1, wherein the first antenna and the second antennas of all different pairs are narrow beam antennas.

6. The method according to claim 1, wherein one of the first antenna and the second antenna of at least one pair is a wide beam antenna.

7. The method according to claim 1, wherein an OFDM modulation scheme is used.

8. The method according to claim 7, wherein subcarriers of the OFDM signal are assigned dynamically on different communication paths and/or different parts of the bandwidth.

9. A non-transitory computer readable medium having instructions stored thereon which, when carried out on a computer, cause the computer to perform the steps of the method of claim 1.

10. A station for performing a wireless communication, comprising:
    at least two first antennas; and
    circuitry configured to perform:
        establishing a plurality of communication paths between different pairs of antennas respectively including a first antenna and a second antenna of a second station;
        selecting, for said plurality of communication paths, a part of bandwidth available on a respective communication path based on a channel transfer function of the communication paths being above a threshold; and
        transmitting and/or receiving data over the selected part of the bandwidth of the respective communication paths selected for the communication path established between the respective pair of antennas, and
        allocating a transmission power dedicated to data transmission over the whole available bandwidth to said selected part of the bandwidth.

11. The station according to claim 10, wherein the threshold is constant, frequency-dependent, or time-dependent.

12. The station according to claim 10, wherein the circuitry is further configured to transmit data over the communication paths according to a modulation scheme that is selected depending on a transfer function of the communication paths.

13. The station according to claim 10, wherein the circuitry is further configured to perform:
    pre-selecting candidate wireless paths between the pairs of antennas;
    selecting the wireless path having a best received signal strength indication and/or signal-to-noise-ratio from among the candidate wireless paths; and
    establishing a communication path over the selected wireless path.

14. The station according to claim 10, wherein the first antenna of all different pairs of antennas is a narrow beam antenna.

15. The station according to claim 10, wherein the first antenna of at least one pair is a wide beam antenna.

16. The station according to claim 10, wherein an OFDM modulation scheme is used.

17. The station according to claim 16, wherein subcarriers of the OFDM signal are assigned dynamically on different communication paths.

18. The station according to claim 10, further comprising a rake receiver.

19. The station according to claim 10, further comprising a channel equalizer circuit.

20. The multiple input multiple output system comprising: a plurality of stations according to claim 10.

* * * * *